(12) United States Patent
Keil et al.

(10) Patent No.: US 9,645,630 B2
(45) Date of Patent: May 9, 2017

(54) SELECTIVELY PERMITTING AN APPARATUS TO BE AWAKENED DEPENDING ON A PROGRAMMABLE SETTING

(71) Applicant: Apple Inc., Cupertino, CA (US)

(72) Inventors: Shane J. Keil, San Jose, CA (US);
Erik P. Machnicki, San Jose, CA (US);
Josh P. de Cesare, Campbell, CA (US)

(73) Assignee: Apple Inc., Cupertino, CA (US)

( * ) Notice: Subject to any disclaimer, the term of this patent is extended or adjusted under 35 U.S.C. 154(b) by 506 days.

(21) Appl. No.: 13/745,731

(22) Filed: Jan. 18, 2013

(65) Prior Publication Data

US 2014/0208135 A1 Jul. 24, 2014

(51) Int. Cl.
*G06F 1/00* (2006.01)
*G06F 9/00* (2006.01)
*G06F 1/32* (2006.01)

(52) U.S. Cl.
CPC .......... *G06F 1/3234* (2013.01); *G06F 1/3203* (2013.01)

(58) Field of Classification Search
CPC .................................................. G06F 1/3234
USPC .................................................. 713/320, 300
See application file for complete search history.

(56) References Cited

U.S. PATENT DOCUMENTS

| | | |
|---|---|---|
| 6,272,645 B1 | 8/2001 | Wang |
| 7,739,528 B2 | 6/2010 | Zhuang et al. |
| 8,024,591 B2 | 9/2011 | Bertelsen et al. |
| 2003/0056131 A1* | 3/2003 | Eberhard et al. ............. 713/320 |
| 2008/0307240 A1* | 12/2008 | Dahan et al. ................. 713/320 |
| 2009/0085684 A1 | 4/2009 | Guo et al. |
| 2009/0135751 A1 | 5/2009 | Hodges et al. |
| 2010/0162019 A1* | 6/2010 | Kumar et al. ................ 713/323 |
| 2010/0218011 A1* | 8/2010 | Diab .................... G06F 1/3209 713/310 |

(Continued)

FOREIGN PATENT DOCUMENTS

| | | |
|---|---|---|
| TW | 200929942 | 7/2009 |
| TW | 201033802 | 9/2010 |
| TW | 201101015 | 1/2011 |

OTHER PUBLICATIONS

International Search Report and Written Opinion in Application No. PCT/US2014/011673 mailed Mar. 28, 2014, 10 pages.

(Continued)

*Primary Examiner* — Robert Cassity
(74) *Attorney, Agent, or Firm* — Meyertons, Hood, Kivlin, Kowert & Goetzel, P.C.

(57) ABSTRACT

Techniques are disclosed relating to power management within an integrated circuits. In one embodiment an apparatus is disclosed that includes a circuit and a power management unit. The power management unit is configured to provide, based on a programmable setting, an indication of whether an attempted communication to the circuit is permitted to cause the circuit to exit from a power-managed state. In some embodiments, the apparatus includes a fabric configured to transmit the attempted communication to the circuit from a device. In such an embodiment, the circuit is configured to exit the power-managed state in response to receiving the attempted communication. The fabric is configured to determine whether to transmit the attempted communication based on the indication provided by the power management unit.

19 Claims, 9 Drawing Sheets

(56) References Cited

U.S. PATENT DOCUMENTS

| | | | |
|---|---|---|---|
| 2011/0142080 A1* | 6/2011 | Diab | H04J 3/0667 370/503 |
| 2011/0213992 A1* | 9/2011 | Satsangi | G06F 1/3209 713/300 |
| 2011/0252251 A1* | 10/2011 | De Cesare et al. | 713/320 |
| 2011/0302401 A1* | 12/2011 | Yokoyama et al. | 713/2 |
| 2013/0067260 A1* | 3/2013 | Gatta | G06F 1/3209 713/323 |
| 2013/0073884 A1* | 3/2013 | Ulmer et al. | 713/320 |
| 2013/0219157 A1* | 8/2013 | Lee | G06F 1/3206 713/1 |

OTHER PUBLICATIONS

Office Action in Taiwanese Application No. 103101855 mailed May 22, 2015, 14 pages.
International Preliminary Report in PCT Application No. PCT/US2014/011673 mailed Jul. 30, 2015, 8 pages.

\* cited by examiner

SELECTIVELY PERMITTING AN APPARATUS TO BE AWAKENED DEPENDING ON A PROGRAMMABLE SETTING

BACKGROUND

Technical Field

This disclosure relates generally to integrated circuits, and, more specifically, to power management of integrated circuits.

Description of the Related Art

As the number of transistors included on an integrated circuit "chip" continues to increase, power management in the integrated circuits continues to increase in importance. Power management can be critical to integrated circuits that are included in mobile devices such as personal digital assistants (PDAs), cell phones, smart phones, laptop computers, net top computers, etc. These mobile devices often rely on battery power, and reducing power consumption in the integrated circuits can increase the life of the battery. Additionally, reducing power consumption can reduce the heat generated by the integrated circuit, which can reduce cooling requirements in the device that includes the integrated circuit (whether or not it is relying on battery power).

One approach to reducing power consumption consists of powering down various circuits that are not being used. In some instances, powering down a circuit may include disabling a clock signal provided to the circuit through clocking gating. In other instances, powering down a circuit may include disabling a power signal provided to a circuit though power gating.

SUMMARY

The present disclosure describes embodiments in which an integrated circuit is configured to power down various circuits (e.g., cause them to enter a power-managed state). In various embodiments, one or more of these circuits are configured such that they may exit a power-managed state in response to receiving a communication (e.g., via an interconnecting fabric). In one embodiment, a programmable setting may be supported that controls whether an attempted communication to a circuit is permitted to cause the circuit to exit from a power-managed state. In some embodiments, the programmable setting is maintained by a power management unit configured to control power to the circuit. In such an embodiment, a fabric may check the programmable setting prior to facilitating an attempted communication with the circuit.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. §112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in a manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

As used herein, the terms "first," "second," etc., are used as labels for nouns that they precede, and do not imply any type of ordering (e.g., spatial, temporal, logical, etc.). For example, in a processor having eight processing cores, the terms "first" and "second" processing cores can be used to refer to any two of the eight processing cores.

As used herein, the term "based on" is used to describe one or more factors that affect a determination. This term does not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

DETAILED DESCRIPTION

Figure 1:
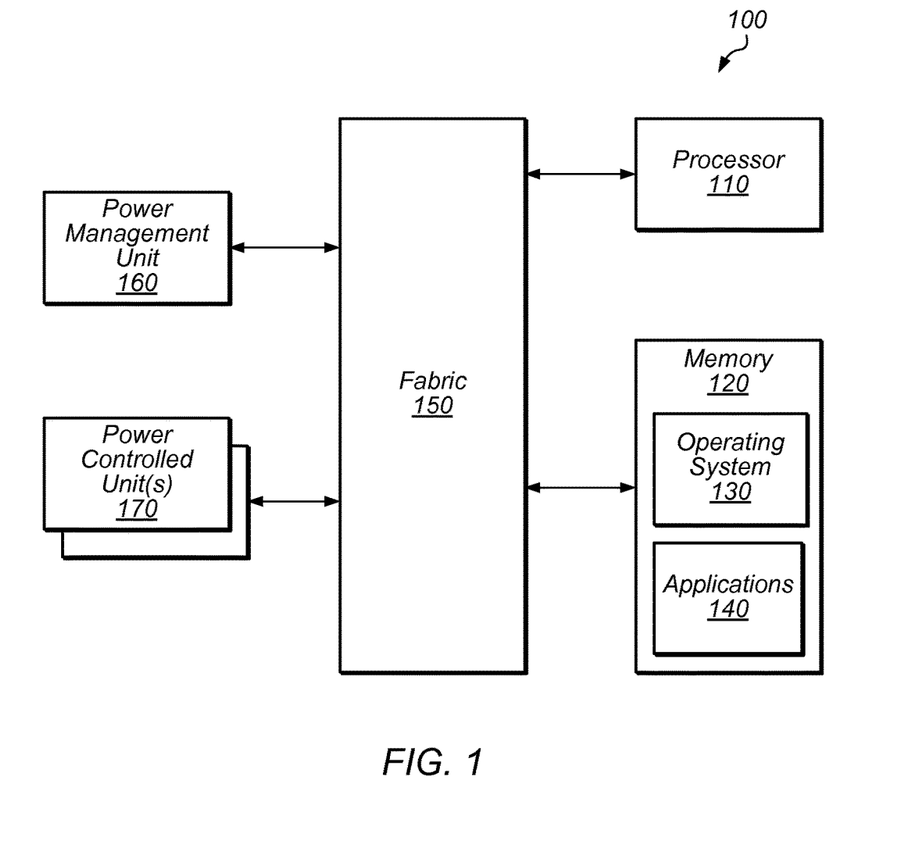
FIG. 1 is a block diagram illustrating one embodiment of a computer system.

Turning now to FIG. 1, a block diagram of one embodiment of a system 100 is shown. As illustrated, system 100 includes various components such as a processor 110, memory 120, power management unit 160, and one or more power controlled units 170. System 100 may correspond to any suitable computer system. Accordingly, in some embodiments, system 100 may be a mobile device (e.g., a mobile phone, a tablet, personal data assistant (PDA), etc.), desktop computer system, server system, network device (e.g., router, gateway, etc.), microcontroller, etc. In one embodiment, multiple components of system 100 may be included together within a system on a chip (i.e., an integrated circuit which integrates components of a computer into a single integrated circuit).

In certain embodiments, system 100 is configured to be power managed. Accordingly, in various embodiments, system 100 may disable power and/or cause one or more circuits (shown as powered controlled units 170) to enter a power-managed state such as when those circuits are inactive. As used herein, the phrase "power down," and the like refers to reducing a circuit's power consumption. This reduction may be achieved, for example, through clock gating (i.e., disabling a circuit's reception of a clock signal), power gating (i.e., disabling a circuit's voltage supply), etc. As used herein, the terms "power-managed state," "low-power state," and the like refer to the placement of a circuit into a state in which a circuit's power consumption is reduced—in some instances, this action may result in the functionality of the circuit being disabled.

In some embodiments, a power-managed state may be applicable to multiple ones of components 110-170 or system 100 as a whole. For example, in one embodiment in which system 100 is a mobile phone, system 100 is configured to enter a power-managed state when the mobile phone is idle (e.g., in a user's pocket). While system 100 is in a low-power state, it may clock gate or power gate power controlled units 170 as discussed below. Power management for system 100 may be desired for many reasons. In some embodiments, power management of system 100 may reduce overall energy consumption, prolong battery life, reduce cooling requirements, and reduce operating costs for energy and cooling.

As illustrated, components of system 100 are coupled via fabric 150. The term "fabric" refers generally to a set of physical connections that are shared among two or more structures (e.g. processor 110 and power management unit 160). These physical connections provide pathways for transferring information within devices, components or units that may be present on system 100. Accordingly, in some embodiments, fabric 150 may include one or more buses, controllers, and/or bridges. For example, in one embodiment, fabric 150 includes a Northbridge and a Southbridge. As discussed further below, in various embodiments, a power controlled unit 170 may be configured such that it will exit a power-managed state upon receiving a communication via fabric 150. In one embodiment, fabric 150 is configured to prevent the attempted communication with a power controlled unit 170 that has entered a power-managed state to prevent it from exiting the power-managed state in response to the communication.

As discussed below, in various embodiments, processor 110 may execute program instructions (e.g., drivers) that control operation of power management unit 160 and power controlled units 170. In such an embodiment, processor 110 may also execute program instructions (e.g., applications 140) that may provide data to be communicated to one or more power controlled units 170. Processor 110 may implement any instruction set architecture, and may be configured to execute instructions defined in that instruction set architecture. The processor 110 may employ any microarchitecture, including scalar, superscalar, pipelined, superpipelined, out of order, in order, speculative, non-speculative, etc., or combinations thereof. The processor 110 may include circuitry, and optionally may implement microcoding techniques. Furthermore, processor 110 may include one or more cache levels. In some embodiments, processor 110 may be a plurality of processors.

In one embodiment, memory 120 stores program instructions executable by processor 110. Memory 120 may be any type of memory, such as dynamic random access memory (DRAM), synchronous DRAM (SDRAM), double data rate (DDR, DDR2, DDR3, etc.) SDRAM (including mobile versions of the SDRAMS such as mDDR3, etc., and/or low-power versions of the SDRAMs such as LPDDR2, etc.), RAMBUS DRAM (RDRAM), static RAM (SRAM), etc. One or more memory devices may be coupled onto a circuit board to form memory modules such as single inline memory modules (SIMMs), dual inline memory modules (DIMMs), etc. In some embodiments, memory 120 may be mounted with an integrated circuit in a chip-on-chip configuration, a package-on-package configuration, or a multi-chip module configuration.

As illustrated, memory 120 may include operating system (OS) 130 and applications 140. In one embodiment, OS 130 manages computer hardware resources and provides common services for computer programs such as applications 140. OS 130 also may include device drivers (or, in other embodiments, device drivers may be considered as external to OS 130) that provide a basic level of control over computer devices such as power management unit 150 and power controlled units 170; device drivers may further facilitate interfacing between applications 140 and computer hardware such as power management unit 160 and power controlled unit 170.

In various embodiments, power management unit 160 is configured to power manage power controlled units 170 (as well as processor 110, memory 120, and/or fabric 150, in some embodiments). Accordingly, in one embodiment, power management unit 160 may coordinate powering down various circuits in system 100 when the system enters a low-powered state. As will be described with respect to FIG. 3, in certain embodiments, power management unit 160 may include one or more memory-mapped registers usable to control power management of certain circuits such as power controlled units 170. In some embodiments, power management unit 160 may power down a circuit by clock gating the circuit and/or power gating the circuit. In some embodiments, the power management unit 160 may be configured to cause a circuit, such as power controlled unit 170, to perform a sequence of events to save state of the circuit prior to powering down that circuit (e.g. prior to resetting the block, applying isolation cells, removing the power, etc.).

As noted above, in one embodiment, power controlled units 170 are circuits that are configured to be power managed by power management unit 160. A power controlled unit 170 may correspond to any suitable circuitry configured to be power managed. In some embodiments, a power controlled unit 170 may be a general purpose processor (e.g., CPU), application specific processor (e.g., graphics processor unit (GPU), I/O device (e.g., display device, network interface device, user input device, etc.), memory device (such as the types listed above), storage device (e.g., hard disk, solid-state drive, etc.), etc. In one embodiment, a power controlled unit 170 is a security processor that is responsible for storing encryption keys for system 100 and performing encryption and decryption operations.

Power controlled units 170 may be power managed responsive to any of various conditions. In one embodiment, a power controlled unit 170 may be powered down in response to OS 130 determining that system 100 should enter a power-managed state. In such an embodiment, OS 130 may implement entering the power-managed state by indicating to each circuit 170's respective driver that its respective circuit should prepare to be powered down. The drivers may, in turn, cause processor 110 to transmit instructions to their respective circuits notifying them that they are to be powered down. In one embodiment, a driver of power management unit 160 may then instruct power management unit 160 via fabric 150 to power down relevant circuits. In some embodiments, instead of a power down request originating from OS 130, a power controlled unit 170 may also be configured to power down itself (e.g., by submitting a request to power management unit 160).

Once powered down, power controlled unit 170 may be configured to power back on in response to various conditions. As discussed above, in some embodiments, power controlled unit 170 is configured such that receiving an attempted communication (e.g., an I/O request) causes the circuit to power back on. In order to prevent it from exiting a power-managed state due to an inadvertent communication, in one embodiment, fabric 150 is configured to prevent a communication from reaching the circuit if it has entered a power-managed state. In some embodiments, fabric 150 may determine whether to permit or prevent communication based on a programmable setting that indicates whether a power controlled unit 170 is permitted to be woken up (referred to below as a wake-up indication). Accordingly, this programmable setting may be altered when a circuit 170 is powered down to prevent the circuit from being woken back up until the programming setting is subsequently cleared. As will be described with respect to FIG. 2, drivers within OS 130 may facilitate setting and clearing this indication. As will be described with respect to FIG. 3, power management unit 160 may include a register that is configured to store the programmable setting.

In various embodiments, supporting a programmable setting to prevent undesired wake up can save power consumption by allowing a power controlled unit 170 to remain in a power-managed state. For example, an application 140 may be unaware that a power controlled unit 170 has entered a power-managed state and initiate a communication to the power controlled unit 170 (such as request to operate on a set of data). Still further, a nefarious application 140 could attempt to access a powered-down power controlled unit 170 in an attempt to achieve some malicious purpose. For example, in one embodiment, an application 140 might attempt to awaken a unit 170 while memory 140 is in a suspended state and cause the unit 170 to access memory 140 in order to cause system 100 to malfunction.

Figure 2:
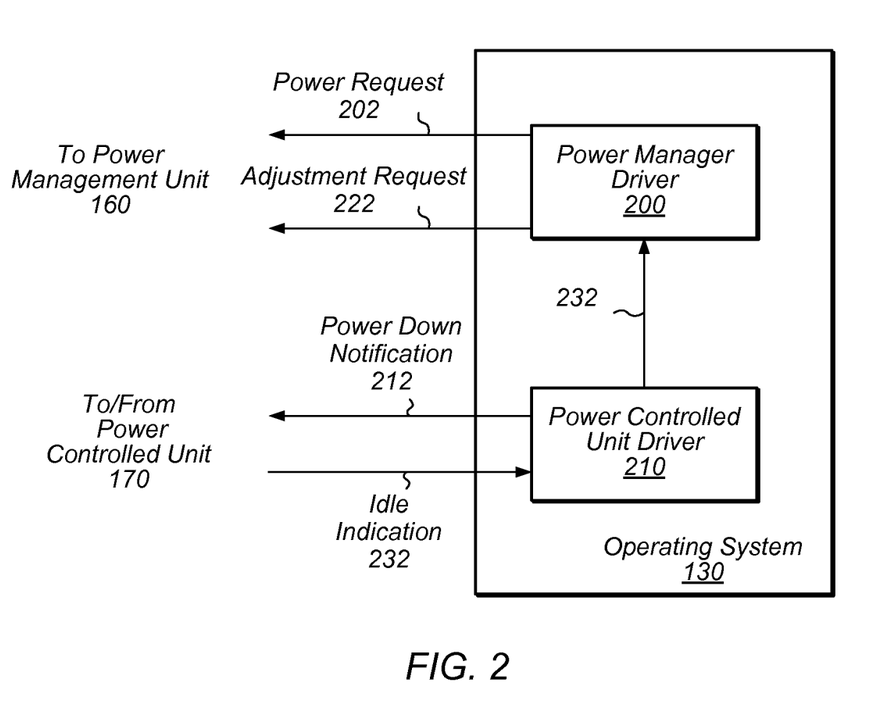
FIG. 2 is a block diagram illustrating one embodiment of an operating system of the computer system.

Turning now to FIG. 2, a block diagram of OS 130 is shown. As discussed above, in various embodiments, OS 130 may manage various operations of system 100 including coordinating the powering down of power controlled units 170. In the illustrated embodiment, OS 130 includes a power manager driver 200 and power controlled unit driver 210.

In one embodiment, power manager driver 200 is configured to control power management unit 160; similarly, power controlled unit driver 210 is configured to control one or more of power controlled units 170. As noted above, in one embodiment, OS 130 may determine to power down system 100. To implement powering down system 100, OS 130 may indicate to power controlled unit driver 210 that it is to prepare a power controlled unit 170 to power down. Driver 210, in turn, issues a corresponding power down notification 212 to power controlled unit 170 to notify it of the OS 130's request. OS 130 may also indicate to power manager driver 200 that the power management unit is to prepare to power down the power controlled unit 170. Power manager driver 200 may then proceed to power down the circuit 170 by sending a power request 202 through the fabric 150 to power management unit 160.

In some embodiments, power controlled unit 170 may issue an idle indication 232 to indicate when it is ready to be powered down after receiving notification 212. For example, in one embodiment, power controlled unit 170 may need to push state to memory 140 prior to entering a power managed state; upon completion, unit 170 may submit an indication 232. In the illustrated embodiment, idle indication 232 is conveyed to power manager driver 200 via power controlled unit driver 210. In such an embodiment, power manager driver 200 may then transmit a power request 202 specifying that the power controlled unit 170 can be powered down. In another embodiment, power controlled unit 170 may provide a signal 232 directly to power management unit 160 via fabric 150 (as opposed to providing to drivers 200 and 210). In such an embodiment, power manager driver 200 may issue a power request 202 to power management unit 160, which waits until receiving an indication 232 before powering down the unit 170.

In one embodiment, once signal 232 is received, power manager driver 200 may also be configured to set a programmable setting within power management unit 160 by sending an adjustment request 222. As discussed above, in various embodiments, this programmable setting (which, in one embodiment, is a bit) controls whether power controlled unit 170 remains in a powered-down state by restricting communication to power controlled unit 170. In one embodiment, power manager driver 200 may also submit an adjustment request 222 to clear the programmable setting as well—e.g., in response to determining to awaken system 100 from a power-managed state.

Figure 3:
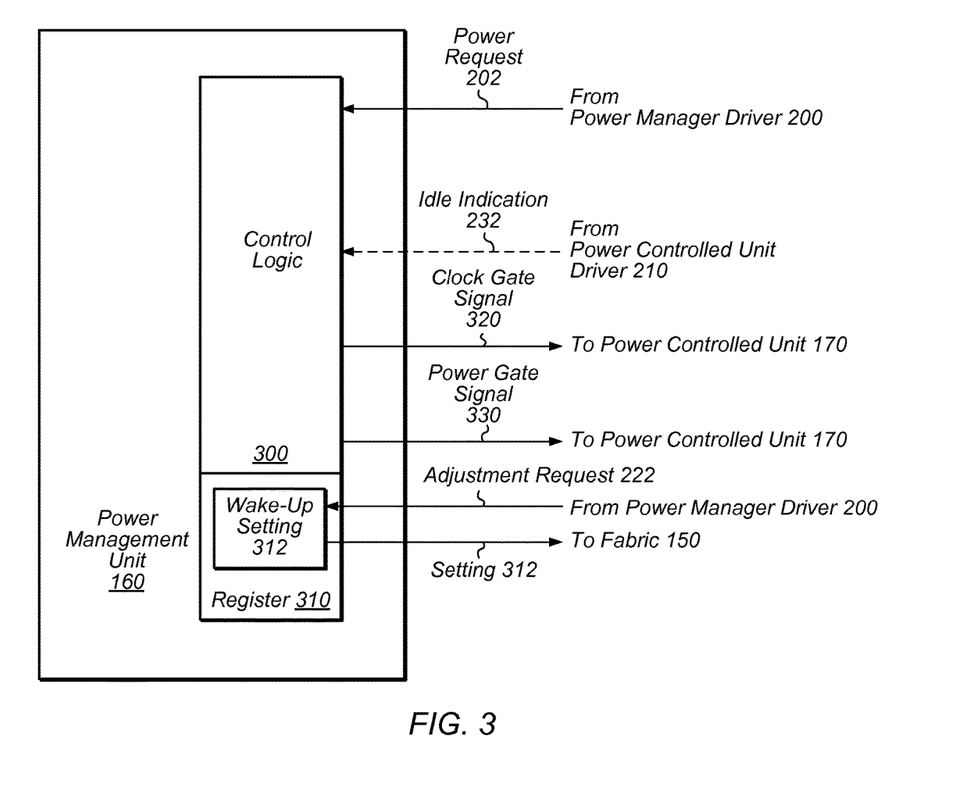
FIG. 3 is a block diagram illustrating one embodiment of a power management unit within the computer system.

Turning now to FIG. 3, a block diagram of power management unit 160 is shown. As discussed above, in various embodiments, power management unit 160 may power manage one or more power controlled units 170. In the illustrated embodiment, power management unit 160 contains control logic 300 and register 310.

Control logic, in one embodiment, is circuitry configured to manage operation of power management unit 160. In the illustrated embodiment, control logic 300 is configured to receive power requests 202 from power manager driver 200. In some embodiments, power requests 202 may be a write operation to one or more addressable registers (not shown) in the power management unit 160 to power down circuits. In one embodiment, upon receiving a request 202, control logic 300 may cause a power controlled unit 170 to enter a power managed state; in some embodiments (as indicated by the dotted line), control logic 300 may wait to power down a power controlled unit 170 until receiving an idle signal 232 from that unit 170 as discussed above. In the illustrated embodiment, control logic 300 may cause a power controlled unit 170 to be clock gated and/or power gated via respective gate control signals 320 and 330 discussed with respect to FIG. 4.

In one embodiment, register 310 is configured to store a programmable setting (shown as wake-up setting 312) usable to control whether a power control unit 170 is permitted to receive a communication via fabric 150 when that unit 170 is in a power managed state. As discussed above, in one embodiment, power manager driver 200 may issue an adjustment request 222 (e.g., a write request to an address of register 310) after receiving an idle signal 232. As discussed with respect to FIG. 5, in various embodiments, fabric 150 may read setting 312 from register 310 in order to determine whether it should deliver an attempted communication to a power controlled unit 170.

In some embodiments, access to register 310 is restricted such that OS 130 is able to access and modify the contents of register 310 while applications 140 cannot. Still further in one embodiment, only power manager driver 200 can access register 310. In some instances, restricting access to register 310 may prevent accidental or nefarious attempts to wake up power controlled unit 170.

Figure 4:
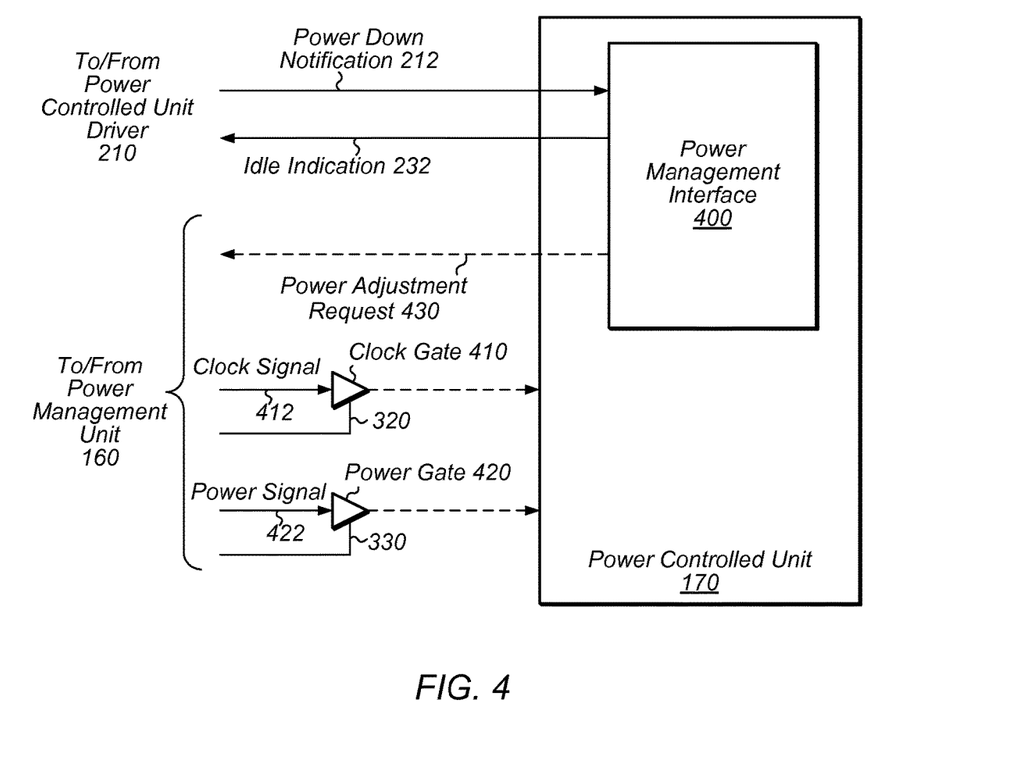
FIG. 4 is a block diagram illustrating one embodiment of a power controlled unit within the computer system.

Turning now to FIG. 4, a block diagram of power controlled unit 170 is shown. As discussed above, in various embodiments, power controlled unit 170 is a circuit configured to be power managed by power management unit 160. In the illustrated embodiment, power controlled unit 170 includes a power management interface 400 and is coupled to clock gate 410 and power gate 420.

Power management interface 400, in one embodiment, is configured to interface power controlled unit 170 with power management unit 160 and power controlled unit driver 210. As illustrated, power management interface 400 may receive a power down notification 212 and send an idle indication 232. (As discussed above, in one embodiment, interface 400 may receive a notification 212 specifying that unit 170 is to prepare to power down; interface 400 may issue an indication 230 upon being idle and ready to be powered down.) In some embodiments, power management interface 400 may also be configured to separately request (i.e., independently of drivers 200 and 210) that it be powered up or powered down via a power adjustment request 430 to power management unit 160. For example, in one embodiment, interface 400 may periodically request that circuit 170 be powered down in response to circuit 170 being idle for a particular period of time.

In the illustrated embodiment, a clock signal 412 and a power signal 422 are provided to power controlled unit 170 via clock gate 410 and power gate 420, respectively. Operation of gates 410 and 420 may be controlled by signals 320 and 330. Accordingly, power management unit 160 may clock gate clock signal 412 by instructing gate 410 to close via signal 320 and may power gate power signal 422 by instructing power gate 420 to close via signal 330.

Figure 5:
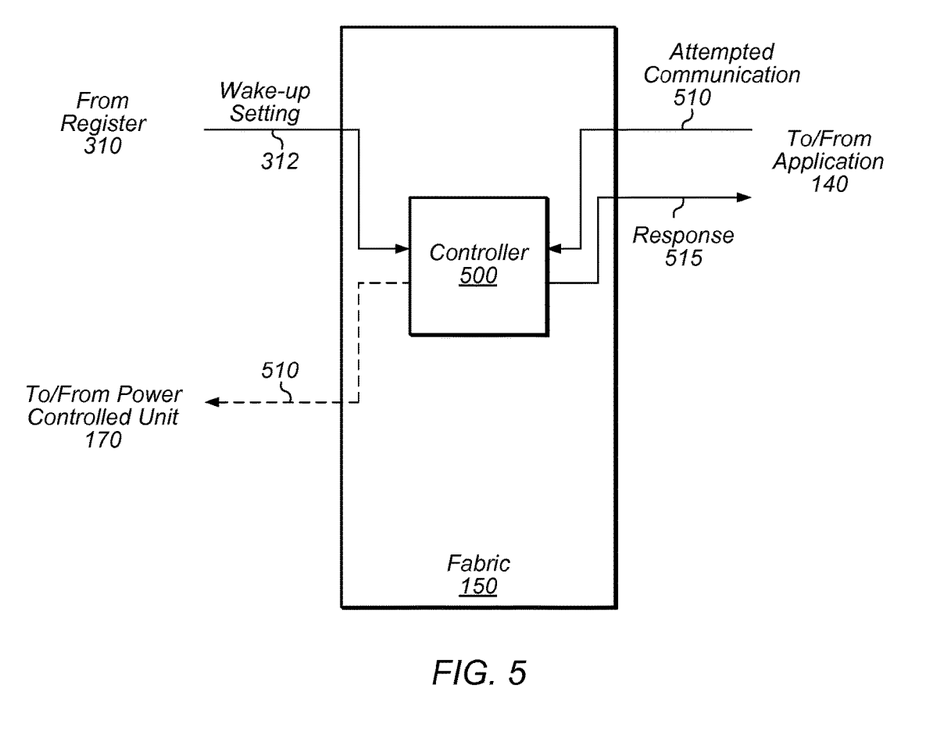
FIG. 5 is a block diagram illustrating one embodiment of a fabric within the computer system.

Turning now to FIG. 5, a block diagram of fabric 150 is shown. As discussed above, in one embodiment, fabric 150 is configured to facilitate communication between units 110-170. In the illustrated embodiment, fabric 150 contains controller 500.

In one embodiment, controller 500 handles message communication over fabric 150. For example, in some embodiments, controller 500 may facilitate direct memory access (DMA) operations. As shown, controller 500 may receive an attempted communication initiated from an application 140 such as attempted communication 510 (in some embodiments, communication 510 may be received from application 140 via power controlled unit driver 210). Fabric 150 may then appropriately route the communication to its destination such as power controlled unit 170 and transmit a corresponding response 515.

As mentioned above, in response to receiving an attempted communication 510, in various embodiments, controller 500 is configured to read the wake-up setting 312 in register 310 to determine whether it should deliver attempted communication 510 to power controlled unit 170. Accordingly, if the value of wake-up setting 312 indicates that power controlled unit 170 is not permitted to be awoken (i.e., receive communication 510), controller 500 may deny (i.e., fail) attempted communication 510. In some embodiments it may also return a response specifying that an error has occurred to prevent fabric 150 from hanging. On the other hand, if the value of wake-up setting 312 indicates that communication is permitted, controller 500 may deliver attempted communication 510 to controlled unit 170 and issue response 515 indicating successful transmittal.

Figure 6:
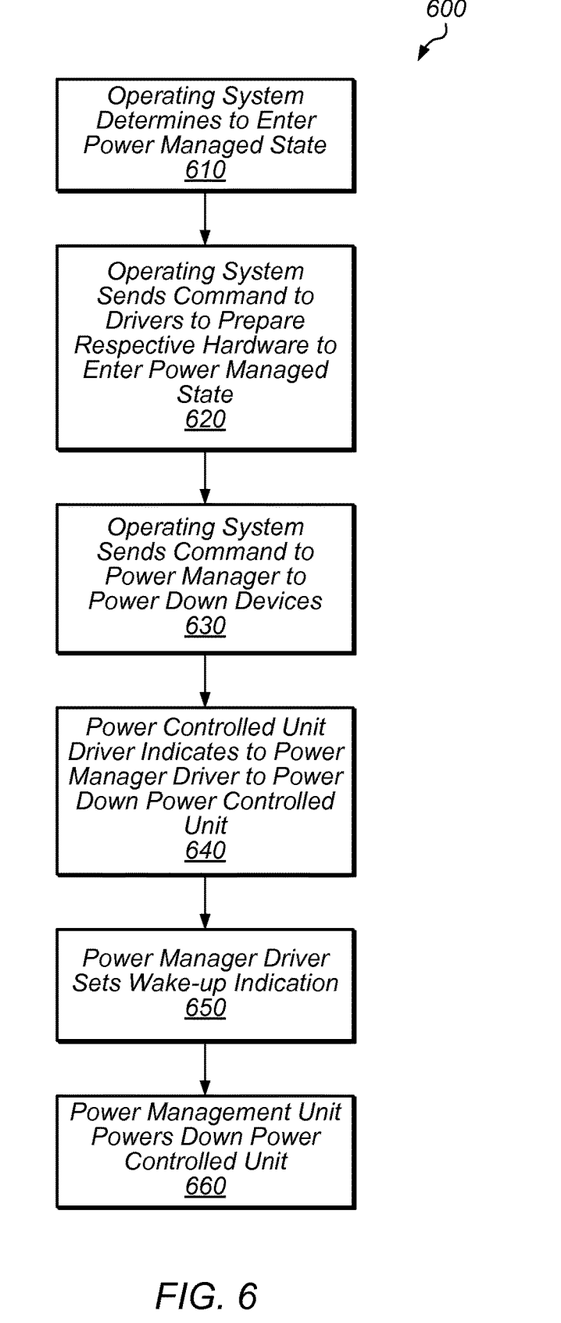
FIG. 6 is a flow diagram illustrating one embodiment of a method for entering a low-power state

Turning now to FIG. 6, a flow diagram illustrating one embodiment of a method for placing the system in a low-power state is shown. Method 600 may be performed by any suitable system that supports power managing one or more circuits such as system 100. In various embodiments, some of the blocks shown in FIG. 6 may be performed concurrently, in a different order than shown, or omitted. Additional method elements may also be performed as desired.

Method 600 begins at step 610 in which an operating system (e.g., OS 130) determines to enter a low-power state. In certain embodiments, step 610 may occur if the operating system determines that portions of the system are idle or if the entire system is idle. For example, in one embodiment in which the operating system is executing on a handset, the handset may be idle while in a user's pocket. In this case, the operating system may determine to enter a low-power state as the handset is not in use. At step 620, the operating system sends a command for device drivers (e.g., power controlled unit driver 210) to prepare respective hardware (e.g., power controlled unit 170) to enter a power down state. In certain embodiments, step 620 includes the device drivers directing respective hardware to complete operation and save state (i.e., perform steps to back up data from a circuit to memory or a hard drive). At step 630, the operating system sends a command to a power manager (e.g., power management unit 160) to power down devices. Next, at step 640 the power controlled unit driver indicates to the power manager driver to power down the power controlled unit (e.g., driver 210 sends an idle indication 232 to driver 200). As mentioned above, in various embodiments, power manager driver 200 does not power down power controlled unit 170 until it receives an idle indication (e.g., idle indication 232). At step 650, the power manager driver sets wake-up indication (e.g. wake-up setting 312). As mentioned above, the wake-up setting may be programmable such that it may indicate to the fabric (e.g. fabric 150) that a power controlled unit should not be woken back up. At step 660, the power management unit proceeds to powers down the power controlled unit. In various embodiments, the power management unit either clock gates or power gates the circuit to power it down.

Figure 7:
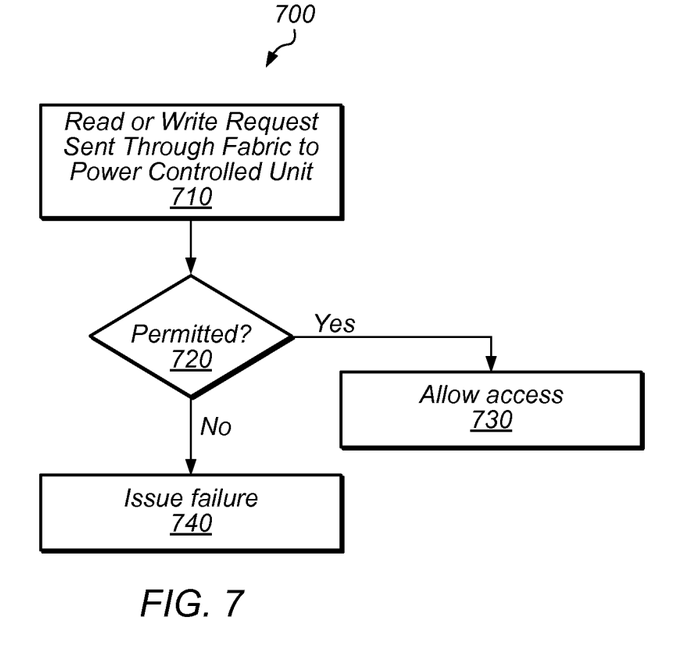
FIG. 7 is a flow diagram illustrating one embodiment of a method in which communication may be sent to a unit located in the computer system.

Turning now to FIG. 7, a flow diagram illustrating one embodiment of a method 700 in which a programmable setting may be used to determine whether an attempted communication reaches a power-controlled unit is shown. Similar to method 600, method 700 may be performed by any suitable system that supports power management. In various embodiments, method 700 may be used by any system that has performed method 600 to power down a circuit. In various embodiments, some of the blocks shown in FIG. 7 may be performed concurrently, in a different order than shown, or omitted. Additional method elements may also be performed as desired.

Method 700 begins at step 710 in which a read or write request (e.g., attempted communication 510) is sent through a fabric (e.g., fabric 150) to a power controlled unit (e.g., circuit 170). At decision step 720, a determination is made regarding whether the read or write request should be sent to the power controlled unit. As mentioned above, in certain embodiments, when the power controlled unit is powered down, a programmable setting may be configured to indicate to the fabric that the power controlled unit is not permitted to be awoken by, for example, a received read or write request. In certain embodiments, step 720 includes a fabric determining whether a read or write request should be transmitted to the power controlled unit by checking the programmable setting (e.g., wake-up setting 312). If the programmable setting indicates that power controlled unit is not permitted to be awoken, flow proceeds to step 740. At step 740, the fabric denies the attempted communication by issuing a failure. As mentioned above, in some embodiments, the fabric may return a response specifying that an error has occurred to prevent the fabric from hanging. Returning to decision block 720, if the fabric determines that an attempted communication should be transmit to power controlled unit (e.g., wake-up setting 312 indicates that power controlled unit 170 is permitted to be awoken), flow proceeds to step 730. As step 730, the fabric allows access to the power controlled unit (e.g., fabric 150 transmits the read or write request to power controlled unit 170.)

Figure 8:
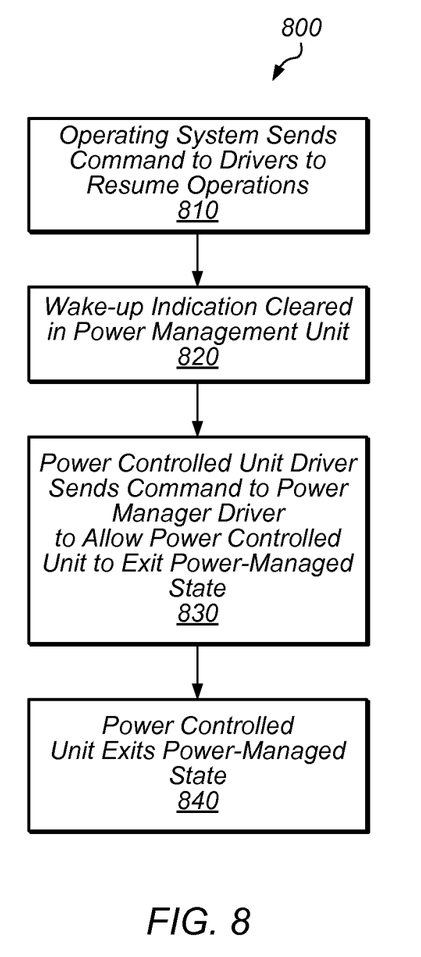
FIG. 8 is a flow diagram illustrating one embodiment of a method for waking up a system from a low-power state.

Turning now to FIG. 8, a flow diagram illustrating one embodiment of a method for waking up a system from a low-power state is shown. In various embodiments, method 800 is performed after a circuit or system has entered a low-powered state using method 600. In various embodiments, some of the blocks shown in FIG. 8 may be performed concurrently, in a different order than shown, or omitted. Additional method elements may also be performed as desired.

Method 800 begins at step 810 in which an operating system (e.g., OS 130) determines that a system should resume normal operations and sends commands to respective drivers (e.g., driver 210). In certain embodiments, an operating system determines to resume normal operations when a user begins interacting with the system. For example, if the system were located in a handheld computer, a user may begin interacting with the system by pressing a button to wake up the system. At step 820, the wake-up indication (e.g., wake-up setting 312) is cleared in the power management unit. At step 830 the power controlled unit driver (e.g., driver 210) sends a command to the power manager driver (e.g. driver 200) to allow the power controlled unit to exit the power-managed state. To accomplish this, in certain embodiments, the power manager unit may instruct a gate to open via a signal (e.g., signal 320 or 330) to remove the power gate or clock gate on a signal. At step 840, the power controlled unit exits the power-managed state.

Figure 9:
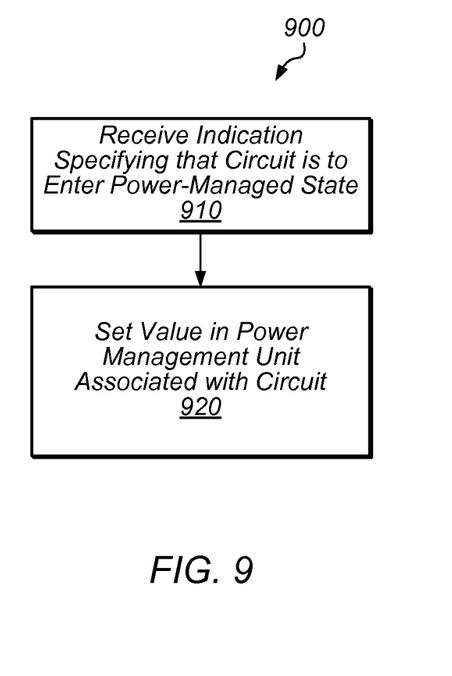
FIG. 9 is a flow diagram illustrating one embodiment of a method that may be performed by a driver of a computer system.

Turning now to FIG. 9, a flow diagram of method 900 is shown. In one embodiment, method 900 may be performed by a driver of a computer system such as driver 200. As shown, method 900 begins in step 910 with receiving an indication specifying that a circuit is to enter a power-managed state. As discussed above, in one embodiment, this indication may come from an operating system (e.g., OS 130). In some embodiments, this indication may be specific to the circuit or relevant to a system that includes the circuit. In step 920, a value in a power management unit associated with the circuit is set (e.g., wake-up setting 312 in register 310). In such an embodiment, this value prevents a bus communication (e.g., via fabric 150) with the circuit while the circuit is in the power-managed state. In some embodiments, method 900 may further include receiving, from a driver of the circuit (e.g., driver 210), a request to permit the circuit to exit the power-managed state and clearing the value to permit the circuit to exit the power-managed state in response to a bus communication with the circuit.

It is noted that various operations described herein (such as those described with respect to method 900) may be performed by a computer system executing program instructions stored on various forms of computer readable media. Generally speaking, a computer readable medium may include any non-transitory/tangible storage media readable by a computer to provide instructions and/or data to the computer system. For example, a computer readable medium may include media such as magnetic or optical media, e.g., disk (fixed or removable), tape, CD-ROM, or DVD-ROM, CD-R, CD-RW, DVD-R, DVD-RW, or Blu-Ray. Such media may further include volatile or non-volatile memory media such as RAM (e.g. synchronous dynamic RAM (SDRAM), double data rate (DDR, DDR2, DDR3, etc.) SDRAM, low-power DDR (LPDDR2, etc.) SDRAM, Rambus DRAM (RDRAM), static RAM (SRAM), etc.), ROM, Flash memory, non-volatile memory (e.g. Flash memory) accessible via a peripheral interface such as the Universal Serial Bus (USB) interface, etc.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. An apparatus, comprising:
   a fabric configured to facilitate communication between a plurality of devices including a first device, wherein the first device is configured to awaken from a power-managed state in response to receiving any communication via the fabric; and
   wherein the fabric is configured to determine whether to allow the first device to exit from a power-managed state based on a programmable setting in response to an attempted communication with the first device, wherein the programmable setting indicates whether the first device is permitted to be awakened and is stored in a memory element included in the apparatus, wherein the apparatus is configured to reject all attempted communications to the first device when a first value of the programmable setting is stored in the memory element and the first device is in a power managed state and is configured to allow attempted communications to the first device when a second value of the programmable setting is stored in the memory element and the first device is in a power managed state, and wherein the programmable setting is programmable by an operating system executed by the apparatus but is not programmable by one or more user applications executed by the apparatus.

2. The apparatus of claim 1, wherein the fabric is configured to read the programmable setting from a register, wherein the register is within a power management unit configured to provide power to the first device.

3. The apparatus of claim 2, wherein in response to the register indicating that a circuit may not be accessed, the fabric is configured to return an error in response to a request to access the first device.

4. The apparatus of claim 2, wherein the fabric is configured to transmit an indication to the power management unit that the apparatus is to exit the power-managed state, and wherein the apparatus is configured to alter the programmable setting in response to the indication.

5. The apparatus of claim 2, wherein the power management unit is configured to alter the programmable setting in response to an indication specifying that the first device is permitted to awaken from the power-managed state.

6. The apparatus of claim 2, further comprising:
the power management unit, wherein the power management unit is configured to clock gate the first device in response to the apparatus entering a power-managed state, wherein the register is configured to be accessible by a driver of the power management unit, wherein the driver is executable to set the programmable setting.

7. The apparatus of claim 1, wherein the first device includes a processor configured to perform encryption and decryption operations.

8. An apparatus, comprising:
a circuit configured to exit a power-managed state in response to receiving a communication while the circuit is in the power-managed state;
a power management unit; and
a communications fabric configured to determine whether to allow the circuit to exit from the power-managed state based on a programmable setting stored in a memory element of the apparatus, wherein the communications fabric is configured to:
reject all attempted communications to the circuit that are received when the stored programmable setting has a first value and the circuit is in the power managed state; and
provide attempted communications to the circuit when the stored programmable setting has a second value and the circuit is in the power managed state;
wherein the power management unit is configured to cause the circuit to enter the power-managed state and change the programmable setting from the second value to the first value based on control software executed by the apparatus that is configured to provide services to applications running on the apparatus.

9. The apparatus of claim 8, wherein the control software is an operating system.

10. The apparatus of claim 8, wherein the circuit, the power management unit, and the communications fabric are included in a single integrated circuit.

11. The apparatus of claim 8, wherein the apparatus is configured to:
receive, from a driver of the circuit, a request to permit the circuit to exit the power-managed state; and
set the programmable setting to the second value in response to the request from the driver of the circuit.

12. The apparatus of claim 8, wherein the apparatus is a telecommunication device, and wherein the apparatus is configured to set the programmable setting to the first value in response to determining that the apparatus is to enter a low-power mode.

13. The apparatus of claim 8, wherein the programmable setting is programmable by the control software executed by the apparatus but is not programmable by one or more user applications executed by the apparatus.

14. The apparatus of claim 8, wherein the circuit is a security circuit configured to store encryption keys.

15. A non-transitory computer-readable medium having instructions stored thereon that are executable by a computing device to perform operations comprising:
programming a programmable setting in a power management unit to indicate whether to permit a circuit to exit a power-managed state in response to communications to the circuit, wherein the programmable setting is stored in a memory element in the computing device and wherein the circuit is configured to exit the power-managed state in response to receiving a communication while the circuit is in the power-managed state;
rejecting all attempted communications to the circuit when a first value is stored in the memory element for the programmable setting and the circuit is in the power-managed state;
providing attempted communications to the circuit when a second value is stored in the memory element for the programmable setting and the circuit is in the power-managed state; and
causing the circuit to enter the power-managed state and changing the programmable setting from the second value to the first value based on control software executed by the computing device that is configured to provide services to applications running on the computing device.

16. The non-transitory computer-readable medium of claim 15, wherein programming the programmable setting comprises programming the programmable setting by a driver executed by the computing device and wherein the programmable setting is not programmable by one or more user applications executed by the computing device.

17. The non-transitory computer-readable medium of claim 15, wherein the control software is an operating system.

18. The non-transitory computer-readable medium of claim 15, wherein the computing device is a mobile phone and wherein the operations further comprising determining that the computing device is to enter the power-managed state based on determining that the mobile phone is idle.

19. The non-transitory computer-readable medium of claim 15, wherein the non-transitory computer-readable medium comprises a driver for the power management unit.

* * * * *